United States Patent
Chen

(10) Patent No.: US 10,637,016 B2
(45) Date of Patent: Apr. 28, 2020

(54) BATTERY COMPARTMENT, BATTERY ASSEMBLY, AND ELECTRONIC CIGARETTE HAVING SAME

(71) Applicant: SHENZHEN IVPS TECHNOLOGY CO., LTD., Shenzhen, Guangdong Province (CN)

(72) Inventor: Wen Chen, Shenzhen (CN)

(73) Assignee: Shenzhen IVPS Technology Co. Ltd., Shenzhen (CN)

( * ) Notice: Subject to any disclaimer, the term of this patent is extended or adjusted under 35 U.S.C. 154(b) by 182 days.

(21) Appl. No.: 15/869,998

(22) Filed: Jan. 12, 2018

(65) Prior Publication Data

US 2018/0205052 A1 Jul. 19, 2018

(30) Foreign Application Priority Data

Nov. 11, 2016 (CN) .................... 2016 2 1261764 U

(51) Int. Cl.
*H01M 2/10* (2006.01)
*A24F 47/00* (2020.01)

(52) U.S. Cl.
CPC ......... *H01M 2/1022* (2013.01); *A24F 47/008* (2013.01); *H01M 2/1055* (2013.01); *H01M 2220/30* (2013.01)

(58) Field of Classification Search
CPC ........... H01M 2/1022; H01M 2220/30; H01M 2/1055; A24F 47/008; A24F 47/002; H05K 5/0239
See application file for complete search history.

(56) References Cited

U.S. PATENT DOCUMENTS

| | | | |
|---|---|---|---|
| 4,204,608 A | 5/1980 | Gatto | |
| 2002/0041493 A1 | 4/2002 | Ferguson et al. | |
| 2006/0290320 A1* | 12/2006 | Kim | H01M 2/1066 320/114 |
| 2010/0014221 A1 | 1/2010 | Shi | |
| 2010/0245659 A1* | 9/2010 | Nam | H01M 2/1022 348/372 |
| 2011/0198119 A1 | 8/2011 | Kajiyama et al. | |
| 2013/0146489 A1* | 6/2013 | Scatterday | A24F 15/20 206/247 |

FOREIGN PATENT DOCUMENTS

WO  2015/010290 A1  1/2015

* cited by examiner

*Primary Examiner* — Lisa S Park
(74) *Attorney, Agent, or Firm* — IP-PAL Patent US

(57) ABSTRACT

The present disclosure provides a battery compartment. The battery compartment includes a main body, and a cover body. The battery compartment further includes a pogo-pin revolving shaft. The pogo-pin revolving shaft includes a sleeve tube, and a spring accommodated in the sleeve tube. The spring has two ends connected to an end shaft respectively. The two end shafts are configured to be exposed out from the two ends of the sleeve tube respectively. The cover body defines a first shaft hole. The main body defines two second shaft holes. The first shaft hole and the two second shaft holes are configured to be arranged correspondingly. The pogo-pin revolving shaft passes through the first shaft hole, the two end shafts are configured to be exposed out from the first shaft hole, and each of the two end shafts is configured to be accommodated in one of the second shaft holes.

7 Claims, 4 Drawing Sheets

US 10,637,016 B2

BATTERY COMPARTMENT, BATTERY ASSEMBLY, AND ELECTRONIC CIGARETTE HAVING SAME

CROSS REFERENCE TO RELATED APPLICATIONS

The present application claims priority to Chinese Patent Application CN 201621261764.7 filed on Nov. 11, 2016.

TECHNICAL FIELD

The present disclosure relates to the technical field of electronic cigarettes, and in particular to a battery compartment, a battery assembly having the same battery compartment, and an electronic cigarette having the same battery assembly.

BACKGROUND

Current electronic cigarette products normally have a power supply device needing to be installed with a battery. The power supply device generally has a battery cover separable through pulling and pushing. Such design has defects that the battery cover is easy to abrade the battery and cause a short circuit and that the battery cover is easy to lose to cause inconveniences to users.

SUMMARY

The present disclosure mainly aims to provide a battery compartment, so as to improve the safety and convenience of installing and removing a battery.

In order to realize the above aim, the present disclosure provides a battery compartment. The battery compartment includes a main body, and a cover body covering the main body. The battery compartment further includes a pogo-pin revolving shaft. The pogo-pin revolving shaft includes a sleeve tube, and a spring accommodated in the sleeve tube. The spring has two ends connected to an end shaft respectively. The two end shafts are configured to be exposed out from the two ends of the sleeve tube respectively. The cover body defines a first shaft hole. The main body defines two second shaft holes. The first shaft hole and the two second shaft holes are configured to be arranged correspondingly. The pogo-pin revolving shaft is configured to pass through the first shaft hole, the two end shafts are configured to be exposed out from the first shaft hole, and each of the two end shafts is configured to be accommodated in one of the second shaft holes.

Preferably, the first shaft hole is an oblong hole.

Preferably, the cover body is provided with a protrusion portion, the protrusion portion defines the first shaft hole, the main body further defines a fitting groove, the fitting groove has two side walls defining one of the second shaft holes respectively, and the protrusion portion is configured to be accommodated in the fitting groove.

Preferably, the main body defines in an end portion thereof an accommodating groove in communication with the fitting groove, the main body further defines a concave portion in communication with the accommodating groove, and the accommodating groove defines in two end walls thereof a snap-in groove along the direction far away from the concave portion respectively; the cover body is provided with two stop blocks at one end far away from the first shaft hole, and each of the stop blocks is provided with a snap projection; the cover body is partially accommodated in the accommodating groove and the concave portion, each of the stop blocks is attached onto one end surface of the concave portion, and the snap projection is snapped in the snap-in groove.

Preferably, the cover body is provided with a handle on one side far away from the main body.

The present disclosure further provides a battery assembly. The battery assembly includes a battery, and the battery compartment described above. The battery is configured to be accommodated in the battery compartment.

Preferably, the battery assembly further includes a conducting strip, the cover body defines a recess on one side facing the main body, and the conducting strip is configured to be accommodated in the recess.

Preferably, the battery assembly further includes a support, the main body defines an accommodating chamber on one side far away from the cover body, the support is configured to be accommodated in the accommodating chamber, the support defines a holding chamber therein, and the battery is configured to be accommodated in the holding chamber.

The present disclosure further provides an electronic cigarette. The electronic cigarette includes the battery assembly described above.

According to the technical scheme of the present disclosure, the cover body is moveably connected to the main body through the pogo-pin revolving shaft. In the process of installing a battery, the cover body does not abrade the battery to cause a short circuit, and meanwhile, the cover body is not separated from the main body and thus will not be lost. Both safety and convenience are improved.

BRIEF DESCRIPTION OF THE DRAWINGS

For a better understanding of the technical scheme in the embodiments of the present disclosure or in the prior art, accompanying drawings needed in the description of the embodiments or the prior art are simply illustrated below. Obviously, the accompanying drawings described below are some embodiments of the present disclosure. For the ordinary skill in the field, other accompanying drawings may be obtained according to the structure shown in these accompanying drawings without creative work.

DESCRIPTION OF REFERENCE NUMBERS

Figure 1:
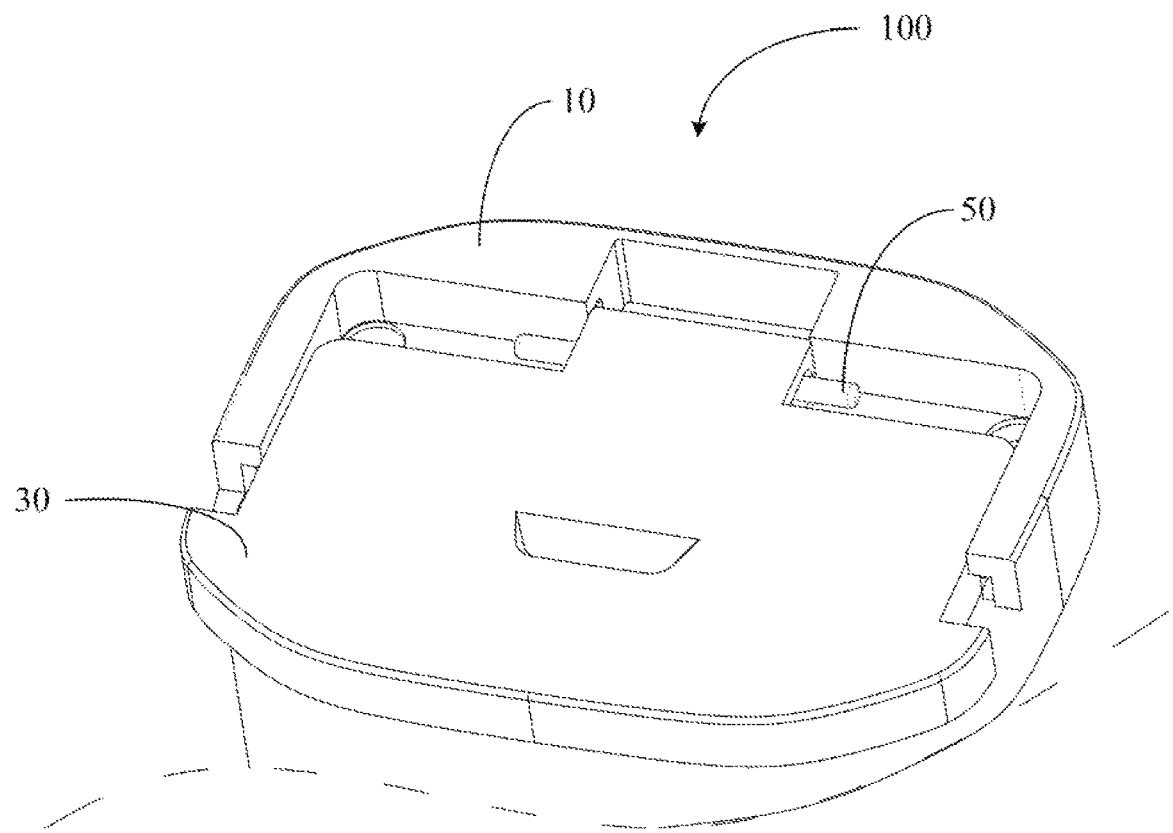
FIG. 1 is a structure diagram of an embodiment of a battery compartment of the present disclosure.

| Reference number | Name of Part | Reference number | Name of Part |
|---|---|---|---|
| 100 | Battery compartment | 33 | Snap projection |
| 10 | Main body | 34 | Stop block |
| 11 | Second shaft hole | 35 | Handle |
| 12 | Concave portion | 37 | Recess |
| 13 | Accommodating groove | 50 | Pogo-pin revolving shaft |
| 131 | Snap-in groove | 51 | Sleeve tube |

-continued

| Reference number | Name of Part | Reference number | Name of Part |
|---|---|---|---|
| 132 | End surface | 53 | End shaft |
| 14 | Fitting groove | 200 | Battery assembly |
| 15 | Accommodating chamber | 210 | Conducting strip |
| 30 | Cover body | 230 | Support |
| 31 | First shaft hole | 231 | Holding chamber |
| 32 | Protrusion portion | | |

The implementation of aims, the function features and the advantages of the present disclosure are described below in further detail in conjunction with embodiments with reference to the drawings.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In addition, terms "first", "second", etc. appearing in the present disclosure are merely for the purpose of description, but cannot be understood as the indication or implication of relative importance or as the implicit indication of the number of the designated technical features; therefore, features defined by "first" and "second" may specifically or implicitly include at least one such feature. In addition, technical schemes of each embodiment of the present disclosure can be combined mutually; however, this must be carried out on the basis that the ordinary skill in this field can implement the combination. When the combination of technical schemes has a conflict or cannot be implemented, it should be considered that such combination of technical schemes does not exist and is not in the scope of protection claimed by the present disclosure.

The present disclosure provides a battery compartment.

Figure 2:
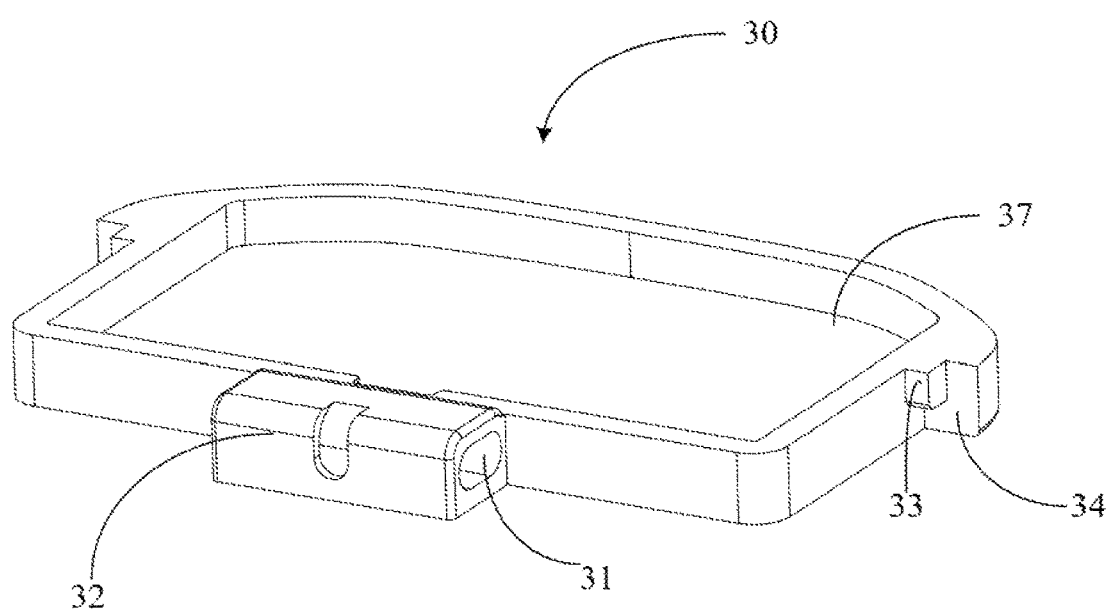
FIG. 2 is a structure diagram of a cover body shown in FIG. 1.
Figure 3:
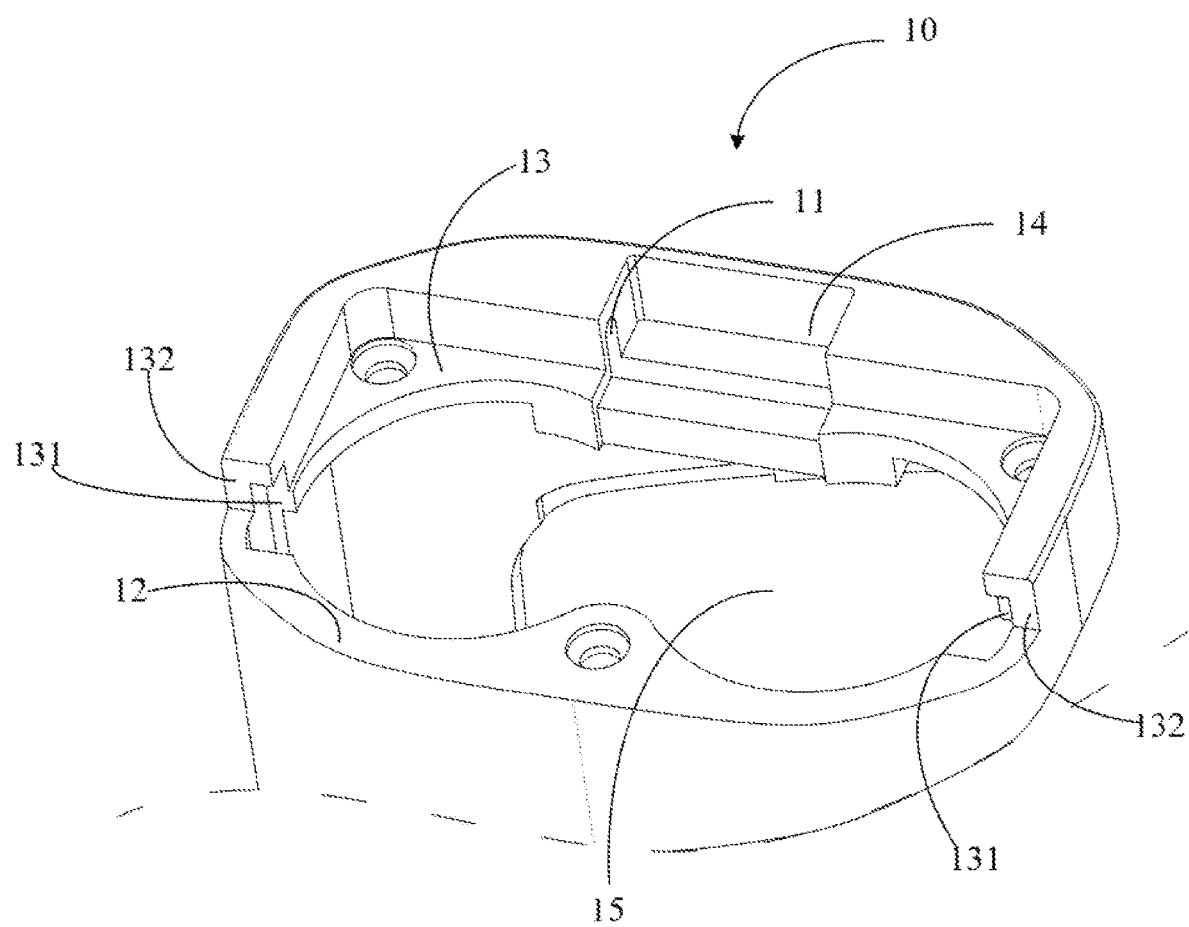
FIG. 3 is a structure diagram of a main body shown in FIG. 1.
Figure 4:
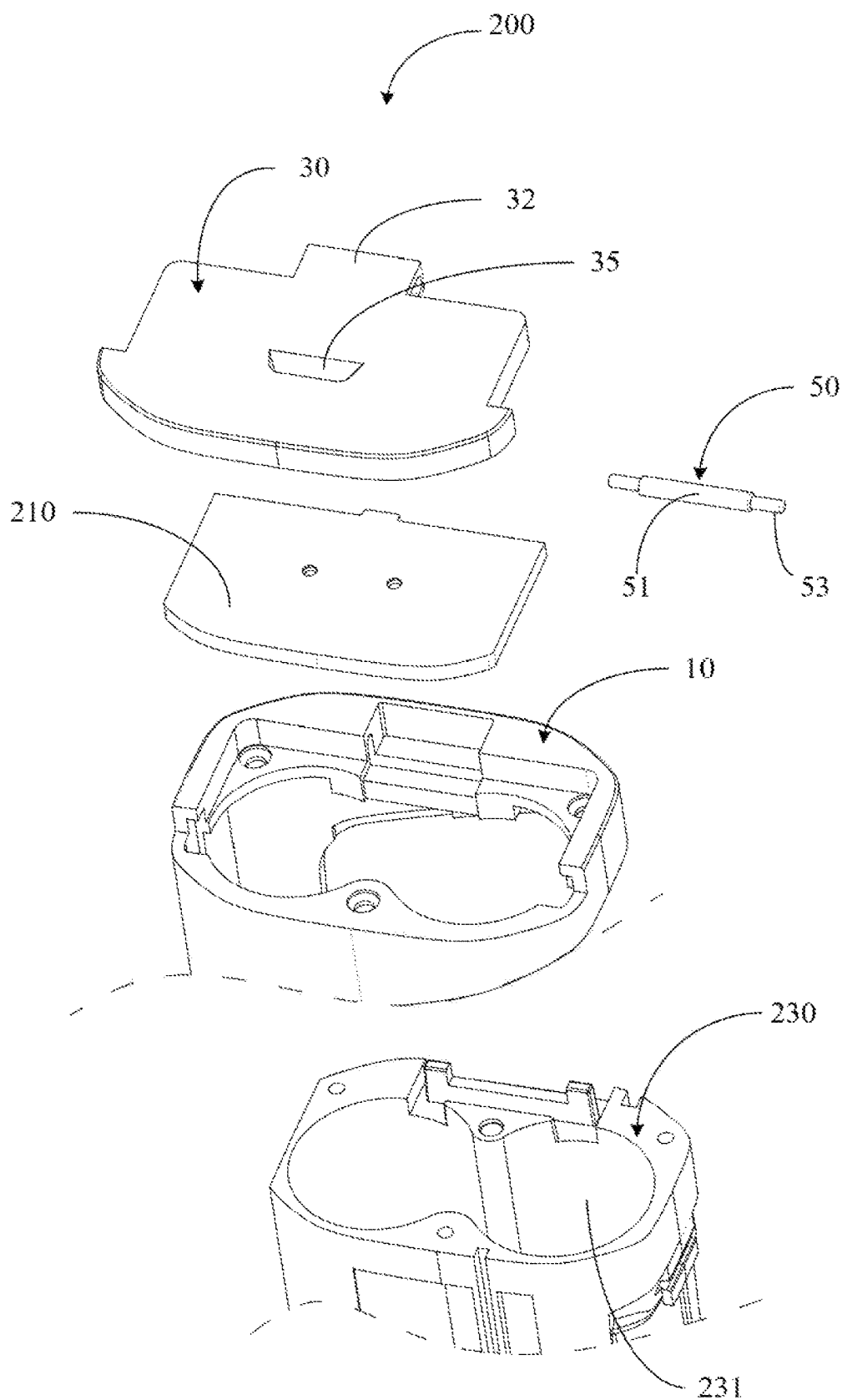
FIG. 4 is an exploded view of an embodiment of a battery assembly of the present disclosure.
Figure 5:
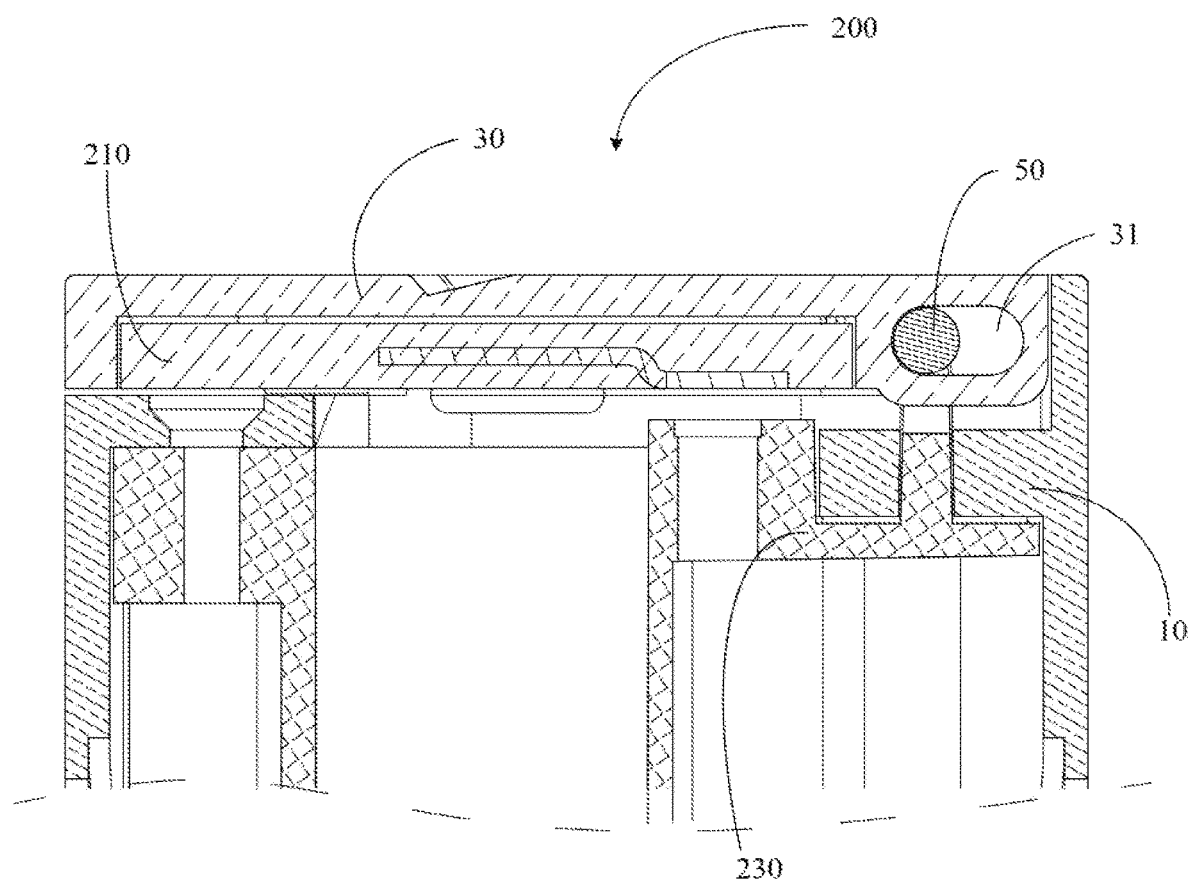
FIG. 5 is a cross-sectional view of the battery assembly shown in FIG. 4.

Referring to FIG. 1 to FIG. 5, FIG. 1 is a structure diagram of an embodiment of a battery compartment of the present disclosure. FIG. 2 is a structure diagram of a cover body shown in FIG. 1. FIG. 3 is a structure diagram of a main body shown in FIG. 1. FIG. 4 is an exploded view of an embodiment of a battery assembly of the present disclosure. FIG. 5 is a cross-sectional view of the battery assembly shown in FIG. 4.

In the embodiment of the present disclosure, the battery compartment 100 includes a main body 10, and a cover body 30 covering the main body 10. The battery compartment 100 further includes a pogo-pin revolving shaft 50. The pogo-pin revolving shaft 50 includes a sleeve tube 51, and a spring accommodated in the sleeve tube 51. The spring has two ends connected to an end shaft 53 respectively. The two end shafts 53 are configured to be exposed out from the two ends of the sleeve tube 51 respectively. The cover body 30 defines a first shaft hole 31. The main body 10 defines two second shaft holes 11. The first shaft hole 31 and the two second shaft holes 11 are configured to be arranged correspondingly. The pogo-pin revolving shaft 50 is configured to pass through the first shaft hole 31, the two end shafts are configured to be exposed out from the first shaft hole 31, and each of the two end shafts 53 is configured to be accommodated in one of the second shaft holes 11, as shown in FIG. 1.

According to the technical scheme of the present disclosure, the cover body 30 is moveably connected to the main body 10 through the pogo-pin revolving shaft 50. In the process of installing a battery, the cover body 30 does not abrade the battery to cause a short circuit, and meanwhile, the cover body 30 is not separated from the main body 10 and thus will not be lost. Both safety and convenience are improved. In the process of mounting the cover body 30 on the main body 10, the two end shafts 53 can be retracted in the sleeve tube 51 to facilitate mounting.

The first shaft hole 31 is an oblong hole.

The technical scheme of the present disclosure deigns the first shaft hole 31 into an oblong hole, which is similar to the shape of a runway and has a center distance of 1.8 mm. The cover body 30 is capable of rotating around the pogo-pin revolving shaft 50 and being pulled and pushed linearly, so as to be opened and closed.

The cover body 30 is provided with a protrusion portion 32. The protrusion portion 32 defines the first shaft hole 31. The main body 10 further defines a fitting groove 14. The fitting groove 14 has two side walls defining one of the second shaft holes 11 respectively, and the protrusion portion 32 is configured to be accommodated in the fitting groove 14.

According to the technical scheme of the present disclosure, the protrusion portion 32 on the cover body 30 is accommodated in the fitting groove 14 on the main body 10, so that the main body 10 and the cover body 30 can be connected through the pogo-pin revolving shaft 50.

The main body 10 defines in an end portion thereof an accommodating groove 13 in communication with the fitting groove 14. The main body 10 further defines a concave portion 12 in communication with the accommodating groove 13. A step is formed where the accommodating groove 13 and the concave portion 12 are connected. The accommodating groove 13 defines in two end walls thereof a snap-in groove 131 along the direction far away from the concave portion 12 respectively. The cover body 30 is provided with two stop blocks 34 at one end far away from the first shaft hole 31. Each of the stop blocks 34 is provided with a snap projection 33. The cover body 30 is partially accommodated in the accommodating groove 13 and the concave portion 12. Each of the stop blocks 34 is attached onto one end surface 132 of the concave portion 12, and the snap projection 33 is snapped in the snap-in groove 131.

According to the technical scheme of the present disclosure, the cover body 30 is accommodated in the accommodating groove 13; meanwhile, the snap projection 33 on the cover body 30 is snapped in the snap-in groove 131 on the main body 10, so that the cover body 30 can be fixed on the main body 10.

In the process of closing the cover body 30, first, the cover body 30 is pulled out the main body 10 linearly, so as to be accommodated in the accommodating groove 13; and then, the cover body 30 is pushed inwards along the wall of the accommodating groove 13, until the protrusion portion 32 abuts against the side wall of the fitting groove 14. At this time, the snap projection 33 on the cover body 30 is snapped in the snap-in groove 131 on the main body 10. The step for opening the cover body 30 is opposite.

The cover body 30 is provided with a handle 35 on one side far away from the main body 10.

According to the technical scheme of the present disclosure, the cover body 30 is provided with the handle 35, so that the cover body 30 can be pulled and pushed to be opened and closed conveniently.

Further, the handle 35 can be a protrusion or recess formed on the surface of the cover body 30.

The present disclosure further provides a battery assembly 200. The battery assembly 200 includes the battery compartment 100 described above. The specific structure of the battery compartment 100 can be referred to the above embodiments. Since the present battery assembly 200 employs all technical schemes of the above embodiment, the present battery assembly 200 at least has all beneficial effects brought by the technical schemes of the above embodiments. No further description is needed here.

The battery assembly 200 further includes a conducting strip 210. The cover body 10 defines a recess 37 on one side facing the main body 10. The conducting strip 210 is adhered to a bottom wall of the recess 37.

According to the technical scheme of the present disclosure, the conducting strip 210 is adhered to one side of the cover body 30, so as to connect positive and negative electrodes of two batteries.

The battery assembly 200 further includes a support 230. The main body 10 defines an accommodating chamber 15 on one side far away from the cover body 30. The support 230 is configured to be accommodated in the accommodating chamber 15. The support 230 defines a holding chamber 231 therein, the holding chamber 231 being configured for holding a battery.

The accommodating groove 13 and the concave portion 12 define a plurality of counter bores on bottom walls thereof. The support 230 defines a plurality of threaded holes in an end portion thereof correspondingly. The fitting groove 14 defines a locating groove in communication with the second shaft holes 11. The support 230 is provided with a bump. The bump defines a through hole configured for allowing the end shaft 53 to pass through. In the process of mounting the support 230 on the main body 10, the support 230 is accommodated in the accommodating chamber 15, and is pushed upwards until the bump is accommodated in the locating groove. At this time, the counter bores are aligned to the threaded holes and bolts are screwed in; thus, the support 230 can be fixed on the main body 10.

The support 230 according to the technical scheme of the present disclosure is connected to the main body 10. The support 230 is configured for holding a battery.

The present disclosure further provides an electronic cigarette. The electronic cigarette includes the battery assembly 200. The specific structure of the battery assembly 200 can be referred to the above embodiments. Since the present electronic cigarette employs all technical schemes of the above embodiment, the present electronic cigarette at least has all beneficial effects brought by the technical schemes of the above embodiments. No further description is needed here.

The mounting process of the battery assembly 200 is as follows.

A double-side tape is attached onto the conducting strip 210. The conducting strip 210 is adhered to the bottom wall of the recess 37 of the cover body 30 through the double-side tape.

The pogo-pin revolving shaft 50 is mounted in the first shaft hole 31 on the cover body 30. The two end shafts 53 are exposed out the cover body 30.

The support 230 is mounted in the main body 10. The main body 10 and the support 130 are fixedly connected through bolts.

The cover body 30 is aligned to the main body 10. Two ends of the pogo-pin revolving shaft 50 are clamped with a pair of tweezers, so that the end shafts 53 are retracted in the sleeve tube 51. The cover body 30 is pushed inwards along the accommodating groove 13. When the first shaft hole 31 is aligned to the second shaft hole 11, the pair of tweezers is released, so that the end shaft 53 stretches into the second shaft hole 11.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

What is claimed is:

1. A battery compartment, comprising a main body, and a cover body covering the main body, wherein the battery compartment further comprises a pogo-pin revolving shaft, the pogo-pin revolving shaft comprises a sleeve tube and a spring accommodated in the sleeve tube, the spring has two ends connected to an end shaft respectively, and the two end shafts are configured to be exposed out from the two ends of the sleeve tube respectively;

the cover body defines a first shaft hole, the main body defines two second shaft holes, the first shaft hole and the two second shaft holes are arranged correspondingly, the pogo-pin revolving shaft is configured to pass through the first shaft hole, the two end shafts are configured to be exposed out from the first shaft hole, and each of the two end shafts is configured to be accommodated in one of the second shaft holes;

wherein the cover body is provided with a protrusion portion, the protrusion portion defines the first shaft hole, the main body further defines a fitting groove, the fitting groove has two side walls defining one of the second shaft holes respectively, and the protrusion portion is configured to be accommodated in the fitting groove;

wherein the main body defines in an end portion thereof an accommodating groove in communication with the fitting groove, the main body further defines a concave portion in communication with the accommodating groove, and the accommodating groove defines in two end walls thereof a snap-in groove along the direction away from the concave portion respectively;

the cover body is provided with two stop blocks at one end away from the first shaft hole, and each of the stop blocks is provided with a snap projection;

the cover body is partially accommodated in the accommodating groove and the concave portion, each of the stop blocks is attached onto one end surface of the concave portion, and the snap projection is snapped in the snap-in groove.

2. The battery compartment according to claim 1, wherein the first shaft hole is an oblong hole.

3. The battery compartment according to claim 1, wherein the cover body is provided with a handle on one side away from the main body.

4. A battery assembly, comprising a battery and the battery compartment according to claim 1, the battery being configured to be accommodated in the battery compartment.

5. The battery assembly according to claim 4, wherein the battery assembly further comprises a conducting strip, the cover body defines a recess on one side facing the main body, and the conducting strip is configured to be accommodated in the recess.

6. The battery assembly according to claim 5, wherein the battery assembly further comprises a support, the main body defines an accommodating chamber on one side away from the cover body, the support is configured to be accommodated in the accommodating chamber, the support defines a holding chamber therein, and the battery is configured to be accommodated in the holding chamber.

7. An electronic cigarette, comprising the battery assembly according to claim 4.

* * * * *